United States Patent
Phalak et al.

(10) Patent No.: US 7,441,452 B2
(45) Date of Patent: Oct. 28, 2008

(54) TPMS SENSOR ASSEMBLY AND METHOD THEREFORE

(75) Inventors: Vinod Phalak, Farmington Hills, MI (US); Robert E. Veres, Northville, MI (US); Daniel P. Dougherty, Newport, MI (US); Robert L. Cross, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 10/908,364

(22) Filed: May 9, 2005

(65) Prior Publication Data
US 2006/0248947 A1 Nov. 9, 2006

(51) Int. Cl.
*E01C 23/00* (2006.01)
(52) U.S. Cl. ........................................................ 73/146
(58) Field of Classification Search ................ 73/146.8, 73/146, 146.5, 146.3; 340/447
See application file for complete search history.

(56) References Cited

U.S. PATENT DOCUMENTS

| | | | |
|---|---|---|---|
| 4,510,484 A | 4/1985 | Snyder | |
| 5,637,926 A | 6/1997 | Zedonis | |
| 6,568,258 B1 * | 5/2003 | Delmoro et al. | 73/146 |
| 6,631,637 B2 | 10/2003 | Losey | |
| 6,672,150 B2 | 1/2004 | Delaporte et al. | |
| 6,694,807 B2 | 2/2004 | Chuang et al. | |
| 6,782,741 B2 | 8/2004 | Imbert | |
| 6,805,000 B1 * | 10/2004 | Sheikh-Bahaie | 73/146.8 |
| 2003/0126918 A1 | 7/2003 | Chuang et al. | |
| 2005/0011257 A1 | 1/2005 | Modawell et al. | |

FOREIGN PATENT DOCUMENTS

| | | |
|---|---|---|
| EP | 1623848 | 2/2006 |
| JP | 2005324732 | 11/2005 |
| WO | 2004/093342 | 10/2004 |

* cited by examiner

*Primary Examiner*—Jewel Thompson
(74) *Attorney, Agent, or Firm*—Dickinson Wright PLLC; Gary Smith; Ray Coppiellie

(57) ABSTRACT

A device for removably attaching a TPMS sensor to a wheel is provided. The device has a structure having a first end section, a second end section and a base. The base separates the first end section from the second end section. A first connector is formed in the first end section and a second connector is formed in the second end section. The device may be selectively attached to a wheel. The device may selectively receive a sensor, the sensor being releasably connectable to the first connector and the second connector of the device. The device may be a cradle for connecting a sensor thereto. Also, a method of using a cradle in a first wheel for use with an automotive vehicle is provided.

31 Claims, 3 Drawing Sheets

TPMS SENSOR ASSEMBLY AND METHOD THEREFORE

TECHNICAL FIELD

The present invention generally relates to a sensor mounting assembly for automotive vehicles and, more particularly, to a structure for mounting a sensor to a wheel and a method therefore.

BACKGROUND OF THE INVENTION

Various types of pressure sensing systems for monitoring the pressure within the tires of an automotive vehicle have been proposed. Such systems generate a pressure signal using an electromagnetic (EM) signal, which is transmitted to a receiver. The pressure signal corresponds to the pressure within the tire. When the tire pressure drops below a predetermined pressure, an indicator is used to signal the vehicle operator of the low pressure. These systems are becoming known as Tire Pressure Monitoring Systems (TPMS).

Various tire manufacturers have suggested various locations for the pressure sensors. Known systems include coupling a pressure sensor to the valve stem of the tire. Other known systems and proposed systems locate the pressure sensors in various locations within the tire wall or tread. Tires are mounted to wheels that are commonly made from steel or aluminum. However, the mounting system fails to allow for simplified replacement or maintenance of sensor units when the tire is un-mounted from the wheel.

U.S. Pat. No. 4,510,484 provides for a Piezoelectric Reed Power Supply for Use in Abnormal Tire Condition Warning Systems. This system discloses a device having a housing, a band for mounting the housing to the tire rim, and a sensor associated with the device for monitoring the condition of the tire. Also, U.S. Pat. No. 6,631,637 B2 provides for a Sensor Mounting Assembly for a Vehicle Tire. This sensor mounting assembly discloses a sensor assembly that includes a pressure sensor and a counterweight mounted to a band. The band extends around the inner diameter of the wheel rim such that the pressure sensor is mounted 180 degrees opposite the counterweight. Further, U.S. Pat. No. 6,805,000 provides for an Apparatus and Method for Mounting a Tire Condition Sensor Capsule to a Wheel Rim. Disclosed is an apparatus for mounting a sensor to the tire rim. The apparatus includes housing with a receptacle having a shape complementary to the capsule to receive the capsule snugly. The housing also has a connector for connecting the housing to the wheel rim such that the capsule is between a portion of the wheel rim and the receptacle. Moreover, U.S. Patent Application Publication 2005/0011257 A1 provides for a Tire Mounting System. This system describes a sensor assembly including a bracket wherein the bracket may be attached to the wheel using an adhesive, such as an adhesive pad with a peel off backing. Alternatively, the bracket may be attached using a strap. However, these systems fail to disclose a structure wherein a sensor may be releasably attached to the structure, thereby allowing for replacement access to the sensor.

U.S. Pat. No. 6,694,807 B2 provides for a Wheel Rim Having a Tire Sensor for a Pneumatic Tire. The wheel includes a sensor set on the base seat and fixed by the upper lid portion. The base seat, having two fastening hooks, can fasten the upper lid portion through the combined action together with the openings of the upper lid portion. The base seat may also be formed integrally with the wheel rim. This reference does not disclose a structure that is selectively attachable to a wheel, where the structure may releasably receive a sensor. Also, the reference fails to provide a structure that is selectively attachable to the wheel without special manufacture of the wheel. Another problem with the above systems is that they fail to have a connection position assurance feature that helps to facilitate proper assembly during routine maintenance of the sensor, tire or wheel.

In view of the above, it would be advantageous to provide a structure that is selectively attachable to a wheel, where the structure is for releasably receiving a sensor. It would also be advantageous to provide a structure that is selectively attachable to a wheel. It would be of further advantage to provide a structure wherein a sensor may be releasably attached to the structure. Another advantage would be to provide a structure capable of releasably receiving a sensor and having a connection position assurance item (CPA) verifying the connection between the sensor and the structure.

SUMMARY OF THE INVENTION

Together with the above-mentioned advantages, a structure for selectively attaching to a wheel and capable of releasably receiving a sensor is provided. Other advantages of the present invention include an attachment mechanism or structure that enables attachment of a sensor to the structure. The sensor may have a standard or specifically designed housing. The structure is also designed for attachment within the wheel, or more particularly into the drop well of a wheel. The structure may be universally compatible with a multitude of wheel designs or over a range of wheel sizes that are available in the OEM and after-market environments. The sensor may be serviced without disturbing the structure's attachment to the wheel, providing yet another novel advantage of the structure. Also, in another advantage, the structure is part of a novel TPMS sensor assembly robustly facilitating the sensor assembly, sensor assembly connection to the wheel during wheel assembly, and subsequent assembly of the tire on the wheel. The final advantage is the structure removes the sensor attachment away from the typical valve stem port, thereby preventing accidental air leakage caused by a sensor valve stem combination.

Briefly, a device for removably attaching a TPMS sensor to a wheel is provided. The device has a structure having a first end section, a second end section and a base. The base separates the first end section from the second end section. A first connector is formed in the first end section and a second connector is formed in the second end section. The device may be selectively attached to a wheel. The device may selectively receive a sensor, the sensor being releasably connectable to the first connector and the second connector of the device. The device may also be a cradle for connecting a sensor thereto.

Also, a method of using a cradle in a first wheel for use with an automotive vehicle is provided. The method includes receiving a first wheel, receiving a cradle and attaching said cradle selectively to said first wheel. The cradle includes a clip end, a hook end and a base, the base separating the clip end from the hook end, the clip end and the hook end each extend substantially radially outward from the base, a clip is formed in the clip end, and at least one hook is formed in the hook end, whereby the cradle may releasably retain a sensor between the clip and the at least one hook. Other methods are also provided.

DESCRIPTION OF PREFERRED EMBODIMENTS

Throughout the figures and in the views, common elements are labeled with the same reference number. The common element may also include an additional number indicating that it is a particular type, kind or style of element for the embodiment presented. The reference numbers indicating a particular type, kind or style of element are not intended to be limiting, and are intended to help the reader in understanding the different embodiments presented in this invention. Reference may be made to the various views of the other figures for a fuller understanding when attention is given to a particular figure.

Figure 1:
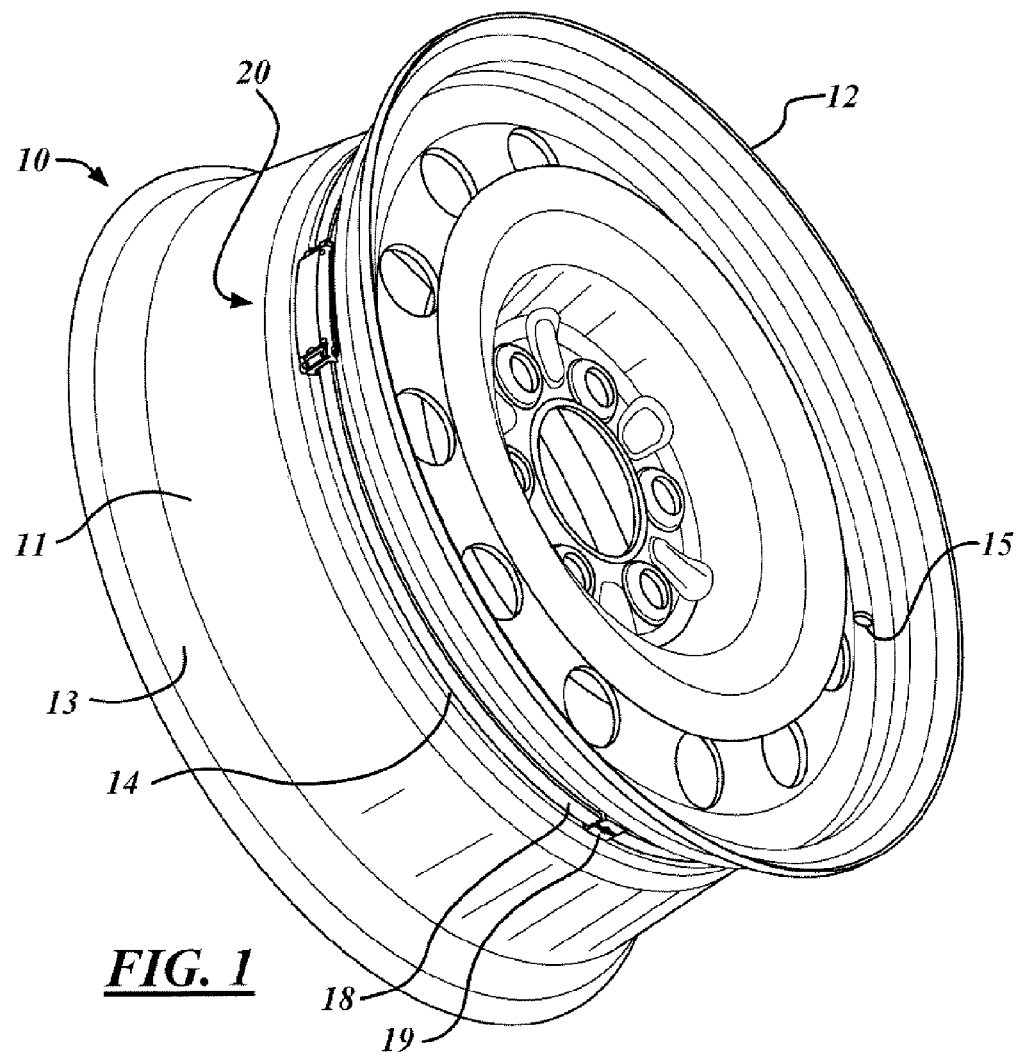
FIG. 1 is a perspective view of a TPMS sensor assembly used on a wheel for an automotive vehicle to advantage.

FIG. 1 shows a perspective view of a TPMS sensor assembly 20 being used to advantage on a wheel 10 for an automotive vehicle. The wheel 10 may selectively receive a tire (not shown) for use in an automotive vehicle (not shown). The wheel 10 typically includes a wheel rim 11 having outside rim flange 12 and inside rim flange 13 for sealingly receiving a tire. The wheel 10 typically has a drop center portion or drop well 14 disposed along its circumference. The drop well 14 is recessed below the flanges 12, 13 and may be located near the center of the wheel 10. The wheel rim 11 includes a valve stem port 15 for sealingly receiving a valve stem assembly (not shown). The valve stem assembly may be used to fill the wheel 14 with a gas, i.e., air, when a valve steam assembly and tire are appropriately mounted upon the wheel 10.

A TPMS sensor assembly 20 is positionably located in the drop well 14 of the wheel 10 by an adhesive strip. In this embodiment the assembly is located 180 degrees from the valve stem port 15. The TPMS sensor assembly 20 is further secured to the drop well 14 by a strip or band 18. The band 18 is secured around the wheel 10 at a band buckle 19. The location of the band buckle 19 may vary, but preference is given to locating the band buckle 19 oppositely from the sensor assembly 20. FIG. 1 shows, for illustrative purposes, the band buckle 19 is located 90 degrees from the valve stem port 15. Locating the band buckle opposite that of the sensor assembly 20 may provide for optimum balancing of the tire and wheel assembly.

The TPMS sensor assembly 20 facilitates the high-speed assembly procedure for mounting and securing the band 18, the assembly 20, wheel 10 and band buckle 19. It is recognized that the band 18 and band buckle 19 may include adjustable band combinations, fixed band combinations, reusable band and buckle combinations, and single use band and buckle combinations. Also recognized, a crimp or dimple buckle with a one-size band may be used to advantage in high production application, such as during OEM operations, or a worm-geared fastener with band may be used to advantage in low production application, such as during a service operation at a tire center. The high-speed assembly procedure using the band 18, band buckle 19 and structure 24 to a wheel to advantage may achieve an assembly rate upwards of 300 pieces per hour.

Figure 2:
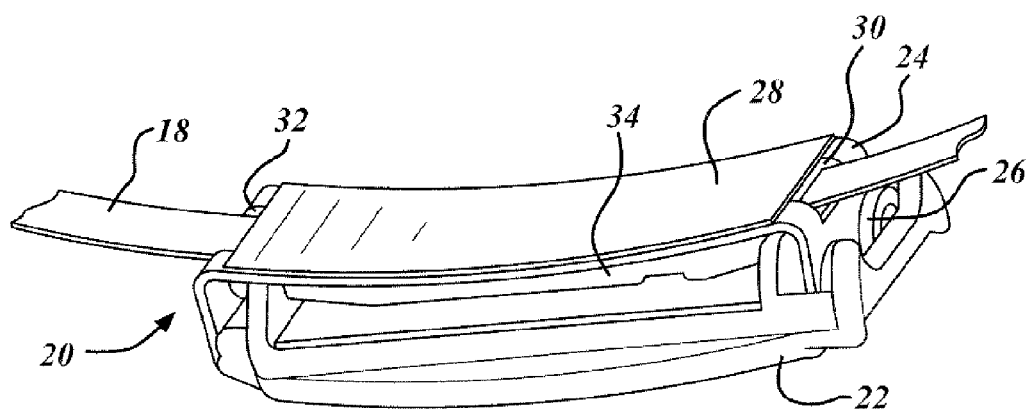
FIG. 2 is a perspective view of the TPMS sensor assembly used to advantage with a band for attaching to the wheel of an automotive vehicle.

FIG. 2 shows a perspective view of the TPMS sensor assembly 20 used to advantage with a band 18 for attaching the assembly 20 to the wheel 10 of an automotive vehicle. The TPMS sensor assembly 20, in the embodiment shown, includes a sensor 21 having a sensor housing 22, a device or structure 24 releasably connected to the sensor housing 22, and a CPA 26 releasably connected to the sensor housing 22. The CPA 26 is only insertable when the sensor housing 22 is fully engage in the structure 24. Also, the TPMS sensor assembly 20, in this embodiment, includes a double sided tape 28 used to attach the assembly 20 to the drop well 14.

The structure 24 includes a first port 30 and a second port 32 for receiving the band 18 through the structure 24. The sensor housing 22 may include a band guide 34, which helps to guide the band 18 from the first port 30 to the second port 32 when the sensor housing 22 is connected to the structure 24.

Figure 3A:
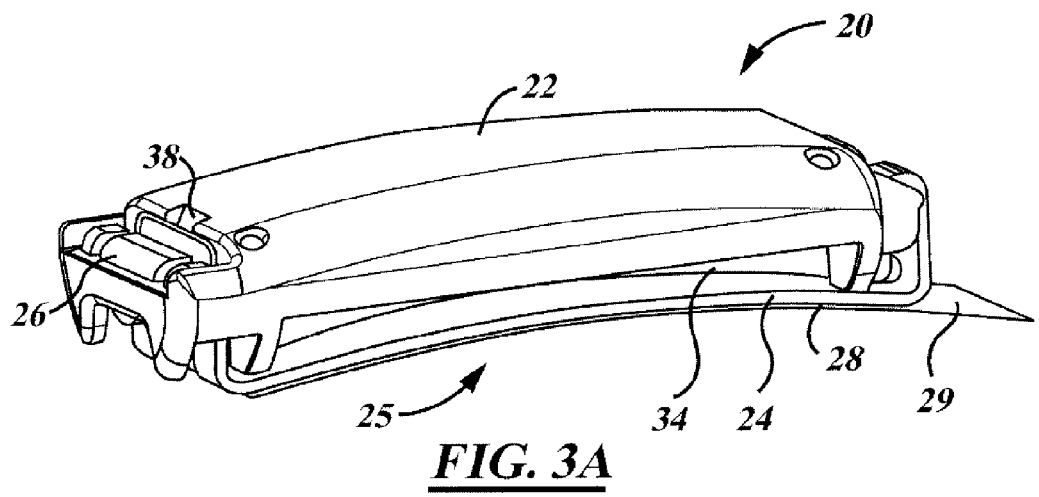
FIG. 3A is an isomeric view of the TPMS sensor assembly.

FIG. 3A shows an isomeric view of the TPMS sensor assembly 20. The TPMS sensor assembly 20 of this embodiment includes the sensor 21, the sensor housing 22, the structure 24, the CPA 26 and a disposable tape liner 29. It is recognized that tape liner 29 may be removed from the tape 28 and discarded when the assembly 20 is selectively attached to a wheel. Also shown, a notch 38 is located in the sensor housing 22. The sensor slot 38 enables disengagement of the structure 24 from the sensor housing 22 when the CPA 26 is first removed.

Although the TPMS sensor assembly is shown with multiple components, it is recognized that the TPMS sensor assembly may include various number of components or as few as only include two components, such as a structure and a sensor housing. The assembly components shown in FIG. 3A are also shown in the exploded view of FIG. 3B.

The structure 24 includes a first end section 44, a second end section 40 and a base 45. The structure 24 may also be a cradle. The base 45 of the structure disposes the clip end or first end section 44 from the hook end or second end section 40. The first end section 44 and the second end section 45 each extend substantially radially outward from the base 45 of the structure 24. A clip or first connector 46 is formed in the first end section 44. A hook or second connector 43 is formed in the second end section 40.

The clip or first connector 46 is a first hole bounded within the clip end 44, thereby allowing the first hole to selectively receive a tongue 54 of a first sensor end of the sensor 21 during assembly.

The hook or second connector 43 includes a first hook 41 and a second hook 42. The hooks 41, 42 are inwardly formed in the outer edge of the hook end or second end section 40, thereby allowing the hooks 41, 42 to selectively receive each of the notches 50, 52 of a second sensor end of the sensor 21. The second connector 43 of the second end section 40 releasably retains the second sensor end of the sensor when the first connector 46 of the first end section 44 of the structure 24 subsequently retains the first sensor end.

Descriptively, the combination of the hooks 41, 42 with notches 50, 52 forms a hinged type of joint between the second ends of the sensor and structure. This descriptive hinge type of joint facilitates the subsequent snap fit coupling of the tongue 54 and clip 46 of the first ends of the sensor and structure.

Optionally, without limitation, the second connector 43 of the second end section 40 may be any type of connector such as a grasp, clamp, clasp, nub, head, tab or prong, just to mention a few, the second connector 43 being configured for maintenance and or removal of the sensor from the structure without necessarily requiring removal of the structure from its mounting place.

Optionally, the first connector 46 of the first end section 44 may have any type of connector such as a way, hole, cavity, key, port, notch or keeper just to mention a few, the first connector 46 being configured for maintenance and or removal of the sensor from the structure without necessarily requiring removal of the structure from its mounting place.

The base 45 of the structure 24 has an arcuate surface 25 that complements the contour of the drop well 14. The arcuate surface 45 has a radius. Alternatively, the base 45 of the structure 24 may compliably compliment the wheel contour to which it may be selectively attached. It may have any shape suitable for using the present invention to advantage. The base 45 need not be arcuate, but may also be concave, convex or flat.

Optionally, the arcuate surface 25 of the base 45 has a radius, the radius ranging between a 14" wheel and a 24" wheel for selectively attaching the base 45 to a wheel. The radius may also range between a 15" wheel and an 18" wheel. The radius may also be for a specific size of wheel.

The structure 24 may include the adhesive or double sided tape 28 connected to the base 45 as shown in FIG. 3A. The other side of the double sided tape 28 may include a tape liner 29 for protecting the integrity of the adhesive until assembly. The tape liner 29 is removable from the tape 28 so that the structure 24 may be selectively connected to the wheel 10. Optionally, any type of adhesive may be used to replace the double sided tape, including glue or epoxy as an example, without limitation. It is also recognized that the structure 24 need not include any adhesive when the structure is attached to the wheel using other fasteners, including mechanical fasteners.

The structure 24 includes ports 30, 32 by which a mechanical fastener or band 18 may positionably retain the structure 24 to a wheel. The first port 30 is bounded within the structure 24 between the first end section 44 and the base 45. The second port 32 is bounded within the structure 24 between the second end section 40 and the base 45. The band 18 may be inserted through the first port 30 and out the second port 32 thereby selectively retaining the base 45 between the band 18 and the wheel 10 when assembled.

Optionally, the ports 30, 32 may have any configuration for receiving the band so that it may retain the structure to the wheel. Optionally, the ports are not necessary when the structure is affixed to the wheel using an adhesive or other recognized fastening means, such as glue, epoxy, loop and hook, and other types of mechanical fasteners, without limitation. As described in the present embodiment of the invention, the structure utilizes the double sided tape and the band to advantage during the assembly process and its subsequent use.

The structure 24 may be made from any suitable material, such as metal. When the structure 24 is made from a metal such as steel, the structure 24 may be stamped from a rectangular blank and then shaped. Efficiently, the waste materials are nearly at or lower than 12% when the structure is made from a rectangular blank. The waste materials are accounted for by the holes that are made in creating the ports, clips and hooks of the structure.

Sensor 21 includes a sensor housing 22. The sensor housing 22 has a horse shoe or first sensor end 53 and a ledge or second sensor end 48. As mentioned, the first sensor end 53 may be releasably connected to the first connector 46 of the structure 24 and the second sensor end 48 may be releasably connected to the second connector 43 of the structure 24.

The sensor housing 22 may include a band guide 34 disposed between the sensor ends 48, 53. The band guide 34 includes a first edge 35 and a second edge 36. The band guide 34 together with the edges 35, 36 may facilitate the insertion of a band from port 30 to port 32 in the TPMS sensor assembly 20. Optionally, the band guide 34 may be a molded channel in the sensor housing.

The sensor housing 22 may accommodate different internal configurations for receiving various electronic package designs, while still providing a novel connection to the structure 24.

Figure 3B:
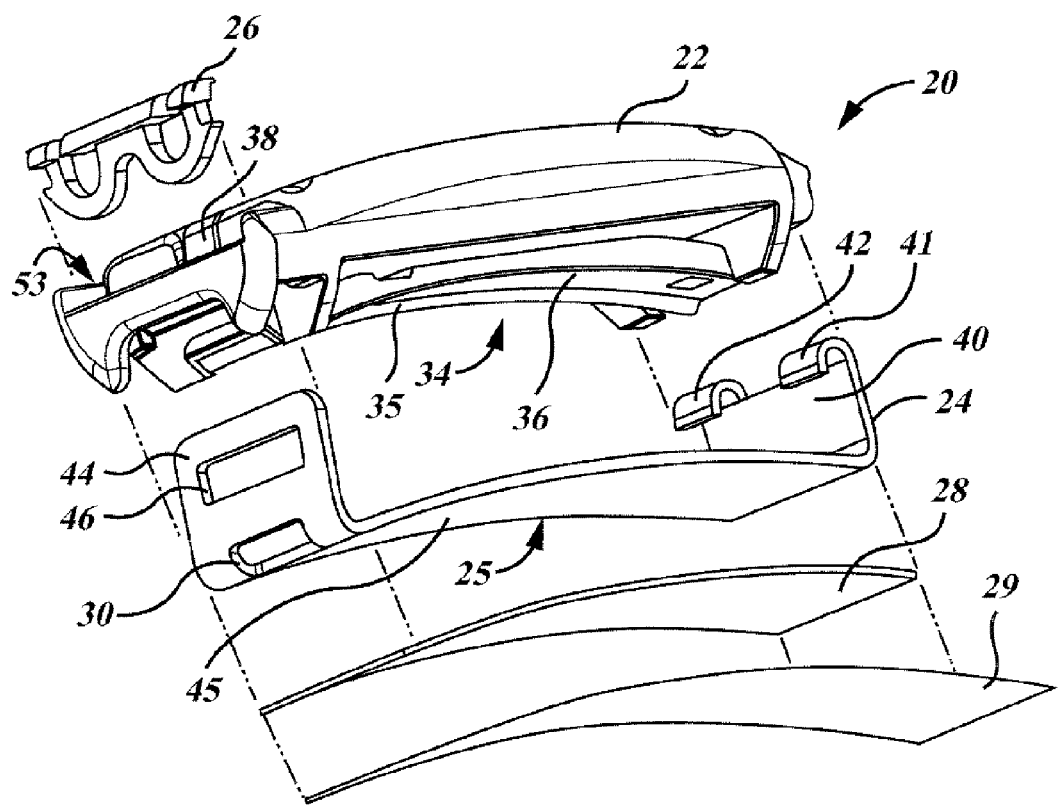
FIG. 3B is an exploded view of the TPMS sensor assembly.

The connector position assurance or CPA 26 may be inserted into the first sensor end 53 of the sensor housing 22. The CPA may provide secondary assurance of proper engagement between the first connector 46 of the structure 24 and the first sensor end 53 of the sensor housing 22. The CPA 26 is preferably insertable into the first sensor end 53 when the first connector 46 is properly coupled to the first sensor end 53. The sensor housing 22 shown in FIGS. 3A and 3B is also shown in the various views of FIGS. 4, 5, 6, 7 and 8. The CPA 26 shown in FIGS. 3A and 3B is also shown in the various views of FIGS. 4, 5, 7, 8, 9 and 10.

Figure 4:
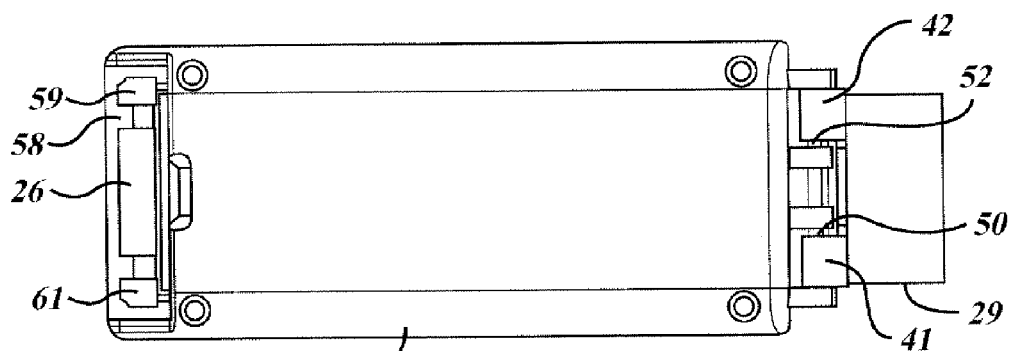
FIG. 4 is a top view of the TPMS sensor assembly shown in FIG. 3A.

FIG. 4 shows a top view of the TPMS sensor assembly 20 as shown in FIG. 3A. The sensor housing 22 includes ports 50 and 52 in the second sensor end 48 hingeably engaging the hooks 41, 42 of the structure 24. The first sensor end 53 may receive the CPA at the deck 58 and may retain the legs 59, 61 of the CPA 26.

Figure 5:
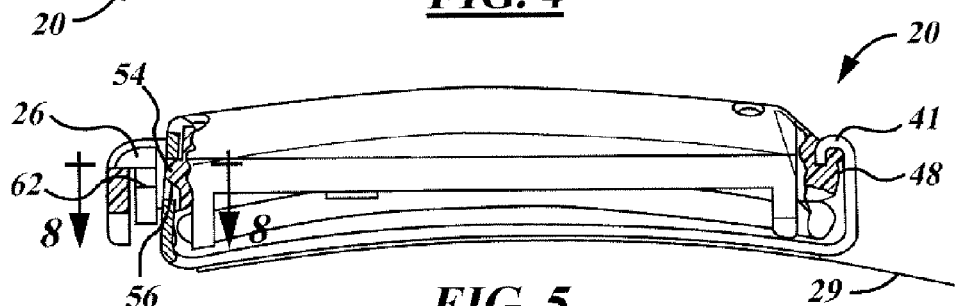
FIG. 5 is a cross sectional side view of the TPMS sensor assembly shown in FIG. 3A.

FIG. 5 shows a cross sectional side view of the TPMS sensor assembly 20 as shown in FIG. 3A. The engagement of the first hook 41 with the second sensor end 48 of the sensor housing 22 is shown. The CPA 26 is shown filling the gap in the first sensor end 53. The CPA 26 may be inserted into the first sensor end 53 after the first connector 46 of the structure 24 engages the tongue 54 of the first sensor end 53 when the first end section 44 is snapped into position after sliding up the ramp 56.

Figure 6:
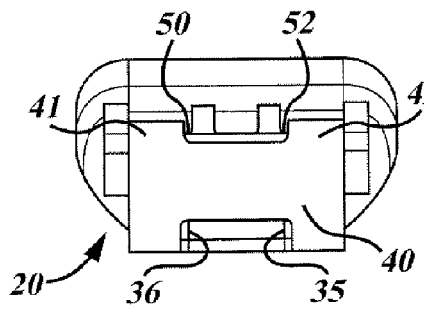
FIG. 6 is a back view of the TPMS sensor assembly shown in FIG. 3A.

FIG. 6 shows a back view of the TPMS sensor assembly 20 as shown in FIG. 3A. The first edge 35 and the second edge 36 of band guide 34 of the sensor housing 22 are shown through the second port 32 of the structure 24, the edges 35, 36 helping to guide a band 18 through the TPMS sensor assembly 20.

Figure 7:
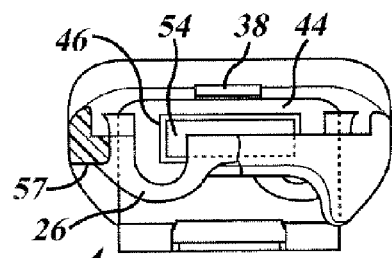
FIG. 7 is a cross sectional front view of the TPMS sensor assembly shown in FIG. 3A.

FIG. 7 shows a cross sectional front view of the TPMS sensor assembly 20 as shown in FIG. 3A. The clip 46 of the first end section 44 of the structure 24 is shown retaining the tongue 54 of the sensor housing 22 in a given direction. The sensor slot 38 may be used, when the CPA 26 is removed, to insert a pry bar into the slot 38 to apply a force in the opposite direction allowing the clip 46 to be released from the tongue 54. Also shown in FIG. 7, the CPA 26 releasably engages a catch 57 of the first end section 44 of the sensor housing 22 approximately in an orthogonal direction.

Figure 9:
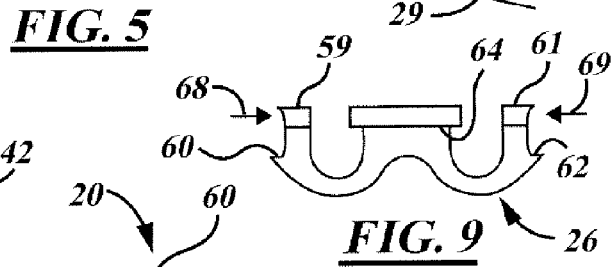
FIG. 9 is a front view of a CPA used for the TPMS sensor assembly to advantage.
Figure 8:
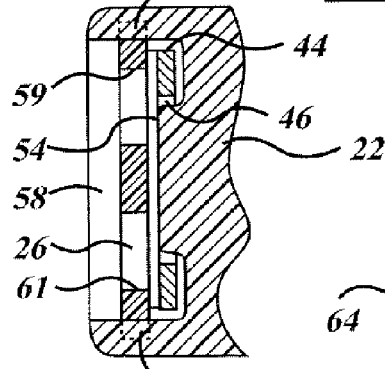
FIG. 8 is a partial cross sectional top view of the TPMS sensor assembly taken as shown in FIG. 5.
Figure 10:
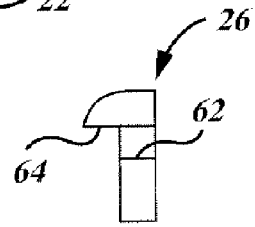
FIG. 10 is a side view of the CPA shown in FIG. 9.

Engagement of the CPA 26 with the sensor housing 22 is shown in FIG. 8. FIG. 8 shows a partial cross sectional top view of the TPMS sensor assembly 20 taken along the line shown in FIG. 5. FIG. 9 shows a front view of the CPA 26. FIG. 10 shows a side view of the CPA 26. The CPA 26 includes the first leg 59, the second leg 61 and the stop 64. The first leg 59 includes a first lock 60. The second leg 61 includes a second lock 62. The legs 59, 61 are resiliently moveable such that an engagement or releasing force (as shown by arrows 68 and 69) may be applied to the CPA 26 for releasably engaging CPA 26 with the sensor housing 22. The locks 60, 62 may engage the catches 55, 57 and the stop 64 may engage the deck 58 thereby securing the CPA 26 to the sensor housing 22. The CPA 26 provides assurance of correct assembling of the TPMS sensor assembly. The CPA 26 is a positive locking device, which also provides secondary assurance of sensor housing engagement in the structure. Moreover, the CPA 26 changes the direction of removal, thereby providing compounded disassembly assurance.

The sensor housing and the CPA may both be out of any suitable material, such as an elastomer. The sensor housing and the CPA may also be made from an ejection molding.

Other unique features of each component of the TPMS sensor assembly may be used to advantage. The sensor assembly fits within the drop well of wheels that meet Tire and Rim Association standards and lie below the bead hump of the wheel. The sensor assembly height may be less than 17 mm and may follow contours of the drop well. The sensor housing may be easily attached by snapping it into the unique cradle design. The cradle may be attached to the inside surface of the wheel and accommodate a generic sensor design. The cradle may act as a carrier for the sensor. The cradle can be attached to wheel using adhesive alone or an adhesive tape and a band. The cradle may be just flexible enough to be used on multiple wheel diameters. The use of an adhesive tape provides for quick fixturing capability during high volume production cycles. The cradle design may permit easy snap-fit assembly and service of the sensor. The CPA component is a "Poke Yoke" type of feature that may ensure the sensor is properly snap-fit into the cradle.

A method of assembling a TPMS sensor assembly 20 is provided. The method includes: receiving a cradle; receiving a sensor; attaching the second sensor end of the sensor to the at least one hook in the hook end of the cradle; and attaching the first sensor end of the sensor to the clip of the clip end of the cradle.

The method of assembling a TPMS sensor assembly 20 may further include: attaching a CPA to the first sensor end, where the CPA is attachable only when the clip end of the cradle and the first sensor end of the sensor housing are securely attached; and attaching a first tape side of a double sided adhesive tape to the base of the cradle, where the second tape side is coupled to a releasably attached adhesive tape liner.

In another method, assembling a TPMS sensor assembly 20 to a wheel 10 for use in an automotive vehicle is provided. The method includes: receiving a first wheel; receiving a TPMS sensor assembly; and attaching the TPMS sensor assembly selectively to the first wheel. The method may further include: attaching the TPMS sensor assembly to the wheel at approximately 180 degrees from the valve stem port in a wheel well of the wheel; receiving a band for attaching of the TPMS sensor assembly to the first wheel; and for receiving a double sided adhesive tape for attaching the TPMS sensor assembly to the first wheel.

In yet another method, assembling a cradle 24 to a wheel 10 for receiving a TPMS sensor 21 for use in an automotive vehicle is provided. The method including: receiving a first wheel; receiving a cradle; and attaching the cradle selectively to the first wheel. The method may further include: attaching the cradle at approximately 180 degrees from the valve stem port in a wheel well of the first wheel; receiving a band for attaching of the cradle to the first wheel; and for receiving a double sided adhesive tape for attaching the cradle to the first wheel.

It is also recognized that the method of assembling the structure 24 or assembly 20 to a wheel 10 may include specific validation and implementation procedures during mounting. Also the validation and implementation procedures may include specification for loading, crimping and positioning of the band and band buckle.

Although the sensor housing 22 was directed towards receiving a TPMS sensor, it is recognized that the sensor housing may receive, contain or support other designs or types of sensors. Moreover, the sensor housing is capable of receiving a sensor package that may measure a host of states, including pressure, rotational speed, acceleration, stress, temperature, or vibration without limitation. The sensor package may include a power source, a data storage device, a processor and a wireless transmitter.

Thus, while embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A device for removably attaching a TPMS sensor to a wheel comprising:
   a structure having a first end section, a second end section and a base, said base separating said first end section from said second end section;
   a first connector formed in said first end section; and
   a second connector formed in said second end section,
   wherein said device is selectively attachable to the wheel and said device may selectively receive the sensor, the sensor being removably connectable to said first connector and said second connector of said device.

2. The device of claim 1 wherein the structure is a cradle.

3. The device of claim 1 wherein said base of said structure compliably compliments the wheel contour to which it may be selectively attached.

4. The device of claim 1 wherein said base of said structure has an arcuate surface.

5. The device of claim 1 further comprising an adhesive coupled to the base, whereby the device is selectively attachable to the wheel by said adhesive.

6. The device of claim 5 wherein said adhesive is a double sided adhesive tape.

7. The device of claim 5 further comprising an adhesive tape liner removeably coupled to said adhesive, said adhesive being coupled between said base and said adhesive tape liner.

8. The device of claim 1 wherein said first end section and said second end section each extend substantially radially outward from said base.

9. The device of claim 1 wherein said first end section is a clip end, and said first connector is a clip.

10. The device of claim 9 wherein said clip comprises a first hole bounded within said clip end, wherein said first hole may selectively receive a tongue of a first sensor end of said sensor.

11. The device of claim 1 wherein said second end section is a hook end, and said second connector is at least one hook, said hook formed in said hook end.

12. The device of claim 11 wherein said device has two hooks inwardly formed in the outer edge of said hook end, wherein said hooks may each selectively receive one of two notches of a second sensor end of said sensor.

13. The device of claim 1 further comprises a first port and a second port, whereby a band may be inserted through said first port and out said second port thereby selectively retaining said base between said band and said wheel.

14. The device of claim 8 further comprises a first port and a second port, wherein said first port is bounded within said structure between said first end section and said base, and said second port is bounded within said structure between said second end section and said base, whereby a band may be inserted through said first port and out said second port thereby selectively retaining said base between said band and said wheel.

15. A TPMS sensor assembly comprising:
   a device as recited in claim 1; and
   a sensor coupled to said device, the sensor comprises a sensor housing, the sensor housing having a first sensor end and a second sensor end, wherein said first sensor end is coupled to said first connector of said first end section and said second sensor end is coupled to said second connector of said second end section.

16. The TPMS sensor assembly of claim 15 further comprising a CPA coupled to said first sensor end, where said CPA may provide secondary assurance of proper engagement between said first connector and said first sensor end of said sensor housing.

17. The TPMS sensor assembly of claim 16 wherein said CPA is insertable into said first sensor end when said first connector is properly coupled to said first sensor end.

18. The TPMS sensor assembly of claim 15 further comprising a double sided adhesive tape, whereby the device is selectively attachable to the wheel by said adhesive.

19. The TPMS sensor assembly of claim 18 further comprising an adhesive tape liner removeably coupled to said adhesive, said adhesive being coupled between said base and said adhesive tape liner.

20. The TPMS sensor assembly of claim 18 further comprising a wheel, wherein the device is selectively attached to said wheel.

21. An assembly comprising:
   a cradle, said cradle comprises a clip end, a hook end and a base, said base separating said clip end from said hook end, said clip end and said hook end each extend substantially radially outward from said base, a clip is formed in said clip end, and at least one hook is formed in said hook end; and
   a sensor coupled to said cradle, the sensor comprises a sensor housing, the sensor housing having a first sensor end and a second sensor end, wherein said first sensor end is coupled to said clip of said clip end and said second sensor end is coupled to at least one hook of said hook end,
   wherein said sensor may be replaceably detached from said cradle.

22. The assembly of claim 21 further comprising a first wheel coupled to said cradle, wherein said sensor may be replaceably detached from said cradle without uncoupling said cradle from said first wheel.

23. The assembly of claim 21 further comprising a CPA coupled to said first sensor end, where said CPA provides secondary assurance of proper engagement between said clip end of said cradle and said first sensor end of said sensor housing.

24. The assembly of claim 21 wherein said clip comprises a first hole bounded within said clip end, wherein said first hole releasably engages a tongue of said first sensor end of said sensor, and said hook end comprises two hooks inwardly formed in the outer edge of said hook end, wherein said hooks releasably engage two notches of said second sensor end of said sensor when said sensor is disengaged from said clip end.

25. The assembly of claim 21 wherein said TPMS sensor assembly is coupled to a wheel well of said first wheel and is positioned upon said wheel well at approximately 180 degrees from a valve stem port on said wheel.

26. The assembly of claim 21 wherein said base of said TPMS sensor assembly is coupled to said first wheel by a double sided adhesive tape.

27. The assembly of claim 21 wherein said cradle further comprises a first port and a second port, wherein said first port is bounded within said cradle between said clip end and said base, and said second port is bounded within said cradle between said hook end and said base, wherein said base of said TPMS sensor assembly is coupled to said first wheel by a band inserted through said first port and out said second port thereby selectively retaining said base between said band and said wheel.

28. The automotive vehicle of claim 27 wherein said sensor housing further comprises a band guide, said band guide providing a passage between said first port and said second port for said band.

29. A method of assembling a TPMS sensor assembly comprising:
   receiving a cradle, said cradle comprises a clip end, a hook end and a base, said base separating said clip end from said hook end, said clip end and said hook end each extend substantially radially outward from said base, a clip is formed in said clip end, and at least one hook is formed in said hook end;
   receiving a sensor, the sensor comprises a sensor housing, the sensor housing having a first sensor end and a second sensor end;
   attaching said second sensor end of said sensor to said at least one hook in said hook end of said cradle; and
   attaching said first sensor end of said sensor to said clip of said clip end of said cradle.

30. The method of assembling a TPMS sensor assembly of claim 29 further comprising attaching a CPA to said first sensor end, where said CPA is attachable only when said clip end of said cradle and said first sensor end of said sensor housing are securely attached.

31. The method of assembling a TPMS sensor assembly of claim 29 further comprising attaching a first tape side of a double sided adhesive tape to said base of said cradle, where the second tape side is coupled to a releasably attached adhesive tape liner.

* * * * *